Aug. 24, 1926.
E. C. GLOVER
1,596,963
AUTO WINDSHIELD SHADE
Filed April 16, 1926
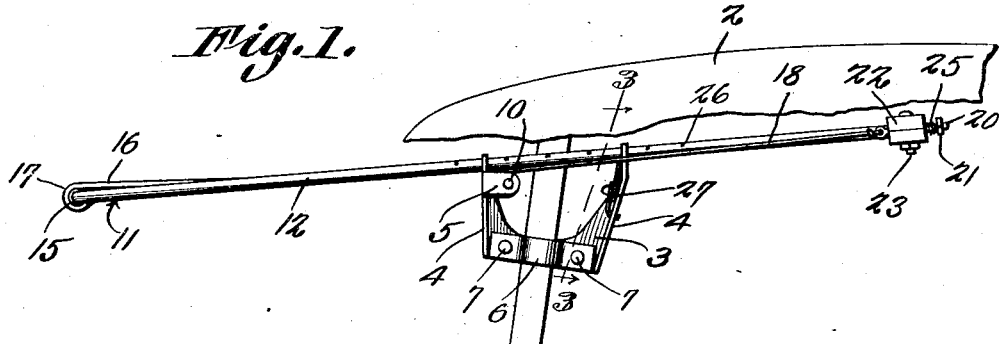
Fig. 1.
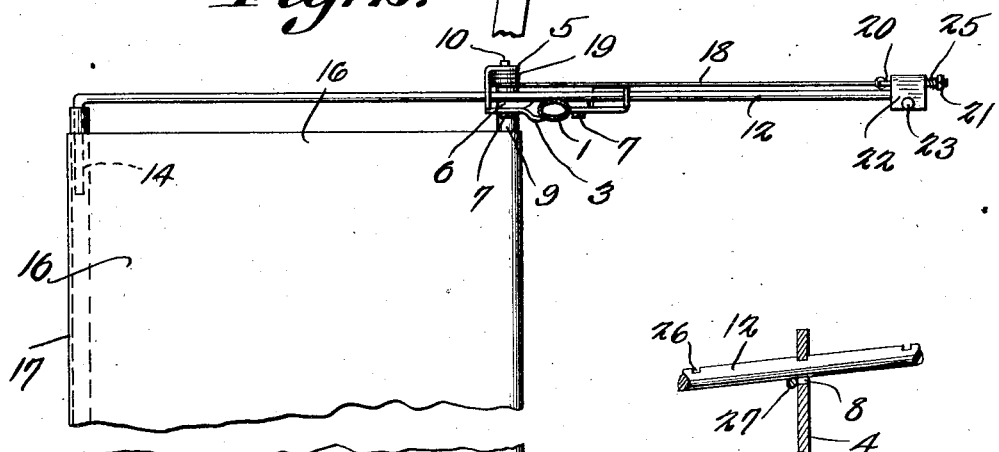
Fig. 2.
Fig. 4.
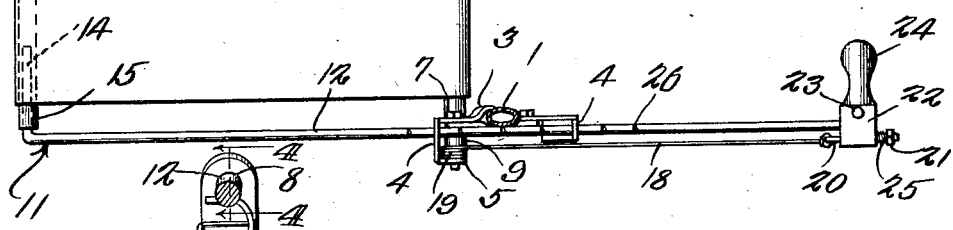
Fig. 3.
E. C. Glover, Inventor,
By C. A. Snow & Co.
Attorneys.

Patented Aug. 24, 1926.

1,596,963

UNITED STATES PATENT OFFICE.

EDMOND C. GLOVER, OF RISON, ARKANSAS.

AUTO WINDSHIELD SHADE.

Application filed April 16, 1926. Serial No. 102,489.

This invention aims to provide novel means for mounting a shade on an automobile, the construction being such that the shade may be moved to and from working position readily, and as an operator may require.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention, mounted on a vehicle;

Figure 2 is a top plan wherein parts are in section; and

Figure 3 is a fragmental section on the line 3—3 of Figure 1.

Figure 4 is a section on the line 4—4 of Figure 3.

In carrying out the invention, the windshield posts are shown at 1, and the top at 2. The device forming the subject matter of this application may be mounted on any kind of an automobile, but, presupposing that it is mounted on a car of the general kind shown in the drawings, supports in the form of clamps are provided, each clamp including a U-shaped member 3, including upstanding arms provided with angularly disposed flanges 4, one of the flanges being provided with a finger or bearing 5 disposed about parallel to the member 3. The U-shaped member 3 of the clamp is placed on one side of the post 1, and on the other side of the post 1 is disposed a jaw 6 that is connected to the base portion of the U-shaped member 3 by tightening devices, such as bolts 7. The flanges 4 are supplied near to their upper ends with openings 8. The numeral 9 designates a roller, the trunnions 10 of which are mounted to rotate in the bearings 5. The roller 9 is not spring-actuated and the simplicity of the device is thereby promoted.

A U-shaped frame 11 is supplied, and embodies side arms 12 mounted for reciprocation in the openings 8 of the supports. At their forward ends, the side arms 12 are equipped with inwardly extended fingers 14, projecting into the ends of a cross bar 15 which may be a simple tube. It is not necessary to fasten the fingers 14 in the ends of the cross bar 15 and the cost of making the device is reduced on account of this item.

A flexible curtain 16 is supplied, and one end of the curtan is provided with a tubular socket 17, into which the cross bar 15 may be slid. At its rear end, the curtain 16 is wound about the roller 9. Flexible elements 18 extend backwardly from the roller 9, and the forward ends of the flexible elements 18 are wound about the edges of the roller, as shown at 19. The curtain 16 is wound in one direction about the roller 9, and the ends of the flexible elements are wound in an opposite direction about the roller, the flexible element and the curtain extending in opposite directions from the roller 9, as Figure 2 will show clearly. The rear ends of the flexible elements 18 are connected to slides 20, such as bolts, provided at their rear ends with adjusting nuts 21. The slides 20 reciprocate in clamp brackets 22 held by tightening devices, such as bolts 23, on the rear ends of the side arms 12 of the U-shaped frame 11. One of the brackets 22 has an inwardly extended handle 24. Compression springs 25 surround the rear ends of the slides 20, and abut against the adjusting nuts 21 and against the brackets. The springs 25 carry the slides 20 rearwardly, thereby keeping the flexible elements 18 taut, it being possible to adjust the effort of the springs 25 by means of the nuts 21.

That one of the side arms 12 which is supplied with the handle 24, is equipped in its upper edge with seats 26. One of the flanges 4 carries a spring 27 of any desired kind, adapted to force upwardly the arm 12 which has the handle 24, so as to engage the seats 26 with the flange 4.

In practical operation, the operator tilts the frame 11 by pressure exerted on the handle 24, thereby disengaging one of the seats 26 from the flange 4. The frame 11 then may be moved forwardly or backwardly. When it is moved forwardly, the curtain 16 is extended, and the flexible elements 18 are wound on the ends of the roller 9. When the frame 11 is pulled rearwardly, the flexible elements 18 unwind from the ends of the roller 9 and wind the curtain 16 on the said roller.

What is claimed is:—

1. In a device of the class described, supports, a U-shaped frame comprising side arms slidable in the supports, and a cross bar connecting the side arms, a roller journaled in the supports, a curtain connected to the cross bar and wound in one direction about the roller, flexible elements wound in an opposite direction about the roller, and means for connecting the rear ends of the flexible elements with the side arms of the U-shaped frame.

2. A device of the class described, constructed as set forth in claim 1, and further characterized by the fact that the last-specified means embodies brackets on the side arms, slides mounted to reciprocate in the brackets and connected to the flexible elements, adjusting devices on the slides, and compression springs interposed between the brackets and the adjusting devices, and constituting means for moving the slides thereby to hold the flexible elements taut.

3. A device of the class described, constructed as set forth in claim 1, and further characterized by the fact that one of the side arms has spaced seats, adapted to be engaged with one of the supports, the said support being provided with a spring means engaging the said side arms to maintain any of the seats thereof engaged with the said support.

In testimony that I claim the foregoing as my own, I have hereto affixed my signature.

EDMOND C. GLOVER.